(12) United States Patent
Ozawa et al.

(10) Patent No.: US 6,268,417 B1
(45) Date of Patent: Jul. 31, 2001

(54) RUBBER COMPOSITION

(75) Inventors: Osamu Ozawa; Tomoji Saitoh; Motofumi Oyama; Manabu Asai, all of Kanagawa (JP)

(73) Assignees: The Yokohama Rubber Co., Ltd.; Nippon Zeon Co., Ltd., both of Tokyo (JP)

( * ) Notice: Subject to any disclaimer, the term of this patent is extended or adjusted under 35 U.S.C. 154(b) by 0 days.

(21) Appl. No.: 09/540,996

(22) Filed: Mar. 31, 2000

(30) Foreign Application Priority Data

Apr. 1, 1999 (JP) .................................................. 11-094824

(51) Int. Cl.$^7$ ................................................ C08K 5/3492
(52) U.S. Cl. ........................... 524/100; 524/101; 524/492
(58) Field of Search .................................... 524/100, 101, 524/492

(56) References Cited

U.S. PATENT DOCUMENTS 4,530,994 * 7/1985 Shimizu et al. ...................... 525/403

FOREIGN PATENT DOCUMENTS

| 55-125155 | 9/1980 | (JP) . |
| 61-104864 | 5/1987 | (JP) . |
| 3-31338 | 2/1991 | (JP) . |

* cited by examiner

*Primary Examiner*—Kriellion Sanders
(74) *Attorney, Agent, or Firm*—Finnegan, Henderson, Farabow, Garrett, & Dunner L.L.P.

(57) ABSTRACT

A rubber composition is provided, which comprises: (1) 100 parts by mass of a hydrogenated acrylonitrile-butadiene copolymer rubber having high rate of hydrogenation; (2) 1 to 10 parts by mass of an organic peroxide; (3) 0.1 to 15 parts by mass of 2,4-dimercapto-6-substituted-1,3,5-triazine; and (4) 1 to 100 parts by mass of an organic peroxide-crosslinkable polymer having an epoxy group. The rubber composition has high adhesiveness to a metal, high modulus, high set resistance and high heat resistance, thereby being capable of suitably utilizing for composites of rubber and metal, such as belts, tires, rolls, and molded goods, particularly, for composite rubber products of the rubber composition and a brass or bronze-plated steel plate.

5 Claims, No Drawings

RUBBER COMPOSITION

FIELD OF THE INVENTION

The present invention relates to a rubber composition having high adhesiveness to metal, high modulus, high compression set resistance and high heat resistance, which enables the production of rubber/metal composite products to be used in the fields that require heat resistance and oil resistance. The composition can be suitably used for the products such as belts, tires, rolls and molded goods.

BACKGROUND OF THE INVENTION

In recent years, many rubber products such as belts, tires, rolls and mold goods come to be used together with an oil heated under high temperature and high pressure for a long time, and deterioration of rubber products under such conditions always brings significant problems. If deterioration of rubber products is remarkable, very much time and labor are needed for maintenance or replacement of such deteriorated rubber products. Sometimes deterioration of rubber products may cause a large accident.

Conventional polymers that have excellent oil resistance and can be durable to continuous use under such high temperature (about 120–150° C.) environment are acrylonitrile-butadiene copolymer rubber (NBR), acrylic rubber (ACM), ethylene-acrylate copolymer rubber (AEM), ethylene-acrylate-vinyl acetate copolymer rubber (ER), ethylene-vinyl acetate copolymer rubber (EVM), chlorosulfonated polyethylene rubber (CSM), chlorinated polyethylene rubber (CM), and hydrogenated acrylonitrile-butadiene copolymer rubber (HNBR) obtained by hydrogenating a conjugated diene unit of acrylonitrile-butadiene copolymer rubber (NBR).

On the other hand, in rubber compositions, it is known that an organic peroxide-crosslinked rubber composition using organic peroxide has excellent heat resistance as compared with a sulfur-vulcanized rubber composition using sulfur in vulcanization.

However, the organic peroxide-crosslinked rubber composition does not generally contain sulfur that reacts with a metal for adhesion. As a result, such an organic peroxide-crosslinked rubber composition has poor adhesiveness to a metal surface and does not adhere to a brass that is plated on a metal surface. Therefore, rubber products composed of a combination of such an organic peroxide-crosslinked rubber composition and a metal such as a brass-plated steel plate have defects in that separation occurs at the interface between a rubber layer and a plated layer, resulting in breakage of the products.

For example, hydrogenated acrylonitrile-butadiene copolymer rubber having high rate of hydrogenation have the characteristics of excellent heat resistance and high modulus, and due to such characteristics, the copolymer rubbers are used for a wide variety of applications. However, since the copolymer rubbers have a low iodine number, it is necessary for the copolymer rubbers to be crosslinked with organic peroxide in using the copolymer rubbers. Thus, sulfur can not be used as a crosslinking agent. Therefore, it is extremely difficult to directly adhere hydrogenated acrylonitrile-butadiene copolymer rubber having high rate of hydrogenation to a metal. For this reason, composite products of rubber and metal, such as belts, tires, rolls and molded goods, could not conventionally been produced.

To overcome the above disadvantages, regarding organic peroxide-crosslinked rubber composition of hydrogenated acrylonitrile-butadiene copolymer rubber, a method is proposed which improves adhesiveness with brass by adding 2,4-dimercapto-6-R-1,3,5-triazine as described in, for example, Japanese Patent Application Laid-open No. Sho 62(1987)-104864. However, this method had the disadvantage that although adhesiveness is improved, modulus and heat resistance decrease due to the reaction between organic peroxide crosslinking agent and 2,4-dimercapto-6-R-1,3,5-triazine. Further, Japanese Patent Application Laid-open No. Hei 3(1991)-31338 proposes a method of improving adhesiveness to brass and modulus by adding 2,4-dimercapto-6-R-1,3,5-triazine and triallyl isocyanurate. However, this method still had the disadvantage that heat resistance is poor.

On the other hand, Japanese Patent Application Laid-open No. sho 55(1980)-125155, for example, discloses that a polymer composition comprising an organic peroxide-crosslinkable polymer, an organic peroxide, an epoxy resin and 2,4-dimercapto-6-R-1,3,5-triazine has good adhesiveness to brass. However, from the results of our investigation and the contents of the working examples, Japanese Patent Application Laid-open No. Sho 55(1980)-125155 utilizes a reaction between chlorine in a chlorine-containing polymer such as chlorinated polyethylene and 2,4-dimercapto-6-R-1,3,5-triazine, reaction between 2,4-dimercapto-6-R-1,3,5-triazine and an epoxy resin and a reaction between 2,4-dimercapto-6-R-1,3,5-triazine and copper in brass. Hydrogenated acrylonitrile-butadiene copolymer rubber that is a chlorine-free polymer does not cause a reaction for adhesion, with the result that adhesiveness is insufficient. Thus, Japanese Patent Application Laid-open No. Sho 55(1980)-125155 had such disadvantage that adhesiveness is not yet sufficient, considering the technical level presently required.

Accordingly, it is extremely difficult to directly adhere hydrogenated acrylonitrile-butadiene copolymer rubber having high rate of hydrogenation to a metal such as brass, and also to obtain a rubber composition having high modulus and high heat resistance. Thus, there is remarkable restriction in the production of composite products of a rubber and a metal, such as belts, tires, rolls and molded goods.

SUMMARY OF THE INVENTION

Accordingly, an object of the present invention is to provide a rubber composition containing hydrogenated acrylonitrile-butadiene copolymer rubber having high rate of hydrogenation, which has high adhesiveness to brass, high modulus, high compression set resistance and high heat resistance, and therefore can suitably be used for a composite of a rubber and a metal, such as belts, tires, rolls and molded goods.

Specifically, the present invention provides a rubber composition comprising:

(1) 100 parts by mass of a copolymer rubber having an iodine value of 15 or less containing, in polymer chain, 10 to 45% by mass of a unit portion (Y portion: VCN) from unsaturated nitrile, 0 to 5% by mass of a unit portion (Z portion: C=C) from conjugated diene and 90 to 50% by mass of a unit portion (X portion: C=C) obtained by hydrogenating the unit portion from an ethylenically unsaturated monomer other than unsaturated nitrile and/or from conjugated diene;

(2) 1 to 10 parts by mass of an organic peroxide;

(3) 0.1 to 15 parts by mass of 2,4-dimercapto-6-substituted-1,3,5-triazine represented by the following formula 1:

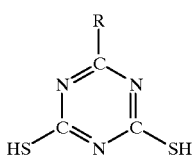

wherein R represents a group selected from the group consisting of mercapto group, alkoxy group, monoalkylamino group, dialkylamino group, monocycloalkylamino group, dicycloalkylamino group and N-alkyl-N-arylamino group; and (4) 1 to 100 parts by mass of an organic peroxide-croslinkable polymer having an epoxy group.

In a preferred embodiment, the polymer having the epoxy group is a graft copolymer in which at least one of graft chains in the graft copolymer has an epoxy group.

In another preferred embodiment, the rubber composition further contains 1 to 30 parts by mass of triallyl isocyanurate and/or triallyl cyanurate.

In a further preferred embodiment, the rubber composition further contains 1 to 50 parts by mass of silica.

DETAILED DESCRIPTION OF THE INVENTION

The present invention will be described in more detail below.

The copolymer rubber used in the present invention is a copolymer rubber having an iodine value of 15 or less containing, in polymer chain, a unit portion (Y portion: VCN) from unsaturated nitrile, a unit portion (Z portion: C=C) from conjugated diene and a unit portion (X portion: C—C) obtained by hydrogenating the unit portion from an ethylenically unsaturated monomer other than unsaturated nitrile and/or from conjugated diene (hereinafter this copolymer rubber is referred to as "hydrogenated acrylonitrile-butadiene copolymer rubber").

In the composition of the hydrogenated acrylonitrile-butadiene copolymer rubber used in the present invention, the Y portion is 10 to 45% by mass, the Z portion is 0 to 5% by mass and the X portion is 90 to 50% by mass. If the Z portion exceeds 5% by mass, heat resistance of the rubber composition becomes insufficient, and if the Z portion falls within the above range, heat resistance is excellent. The copolymer rubber contains the unit portion (Z portion: C=C) from conjugated diene in very small amount of 0 to 5% by mass, and therefore is customarily called "hydrogenated acrylonitrile-butadiene copolymer rubber of high rate of hydrogenation."

The iodine value is a value that mass of iodine that can be added per 100 g of a rubber is expressed as a gram unit. The iodine value is measured according to JIS K6235 and is used as a measure of the degree of unsaturation of a rubber. The smaller the iodine value is, the smaller the degree of unsaturation is. The hydrogenated acrylonitrile-butadiene copolymer rubber used in the present invention has the iodine value of 15 or less, and preferably 10 or less. If the iodine value falls within the above range, the copolymer rubber has excellent heat resistance.

The organic peroxide used in the present invention is not particularly limited so long as it is generally used for rubber crosslinking. However, organic peroxides in which crosslinking reaction does not extremely proceed at a temperature in processing in the rubber composition are preferably, and dialkyl peroxide having a decomposition temperature (a temperature at which a half-life value is 10 hours) of 80° C. or higher is more preferable. Specific examples of the organic peroxide include dicumyl peroxide, di-t-butyl peroxide, 1,3-bis(t-butyl peroxyisopropyl)benzene, n-butyl 4,4'-di(t-butyl peroxy)valerate and 2,5-dimethyl-2,5-di(t-butyl peroxy)hexane.

The content of the organic peroxide in the rubber composition of the present invention is preferably 1 to 10 parts by mass per 100 parts by mass of the hydrogenated acrylonitrile-butadiene copolymer rubber. If the content of the organic peroxide is less than 1 part by mass, crosslinking density decreases, and modulus or the like may be impaired. If it exceeds 10 parts by mass, crosslinking density increases, an elongation at break may lower. If the content of the organic peroxide falls within the above range, crosslinking density is appropriate, with the results that modulus and elongation at break are good.

In 2,4-Dimercapto-6-substituted-1,3,5-triazine represented by the above formula 1 used in the present invention, R in the formula is a group selected from the group consisting of mercapto group, alkoxy group, monoalkylamino group, dialkylamino group, monocycloalkylamino group, dicycloalkylamino group and N-alkyl-N-arylamino group. Considering bonding rate between a metal and a polymer having epoxy group, that is, timing of crosslinking reaction and adhesion reaction, 2,4,6-trimercapto-6-substituted-1,3,5-triazine wherein R is mercapto group, is preferable. Further, 2,4-dimercapto-6-substituted-1,3,5-triazine, represented by the above formula 1 wherein R is at least two different groups, may be used in combination.

The content of 2,4-dimercapto-6-substituted-1,3,5-triazine, represented by the above formula 1 in the rubber composition of the present invention, is preferably 0.1 to 15 parts by mass per 100 parts by mass of the hydrogenated acrylonitrile-butadiene copolymer rubber used in the present invention. If the content of 2,4-dimercapto-6-substituted-1,3,5-triazine in the rubber composition is less than 0.1 part by mass, there is the case that adhesiveness between the rubber composition and a metal is insufficient. On the other hand, if the content of 2,4-dimercapto-6-substituted-1,3,5-triazine exceeds 15 parts by mass, the reaction with the organic peroxide occurs many times, which impairs crossslinking. In addition, there may be the case that modulus decreases. Further, if the content of 2,4-dimercapto-6-substituted-1,3,5-triazine exceeds 15 parts by mass, the reaction with a polymer having epoxy group described after occurs many times. As a result, of the polymers having epoxy group in the rubber composition of the present invention, polymers that bond to hydrogenated acrylonitrile-butadiene copolymer rubber are decreased. Further, there may be the case that adhesiveness between the rubber composition and a metal is insufficient.

The polymer having epoxy group used in the present invention can be crosslinked with the organic peroxide. In an epoxy resin such as bisphenol A-epichlorohidrin type, crosslinking by the organic peroxide is difficult to occur. Accordingly, such an epoxy resin is not included in the organic peroxide-crosslinkable polymer having epoxy group used in the present invention. If the epoxy resin is used in place of the organic peroxide-crosslinkable polymer having epoxy group used in the present invention, bonding to the hydrogenated acrylonitrile-butadiene copolymer rubber is less, with the result that, adhesiveness between the rubber composition and a metal is insufficient.

The content of the polymer having epoxy group in the rubber composition of the present invention is 1 to 100 parts by mass, and preferably 5 to 50 parts by mass, per 100 parts by mass of the hydrogenated acrylonitrile-butadiene copolymer rubber used in the present invention, though it depends on the amount of epoxy group and the like. If the content of the polymer having epoxy group is less than 1 part by mass, there may be the case that adhesiveness between the rubber composition and a metal is insufficient. On the other hand, if the content of the polymer having epoxy group exceeds 100 parts by mass, there may be the case that adhesiveness between the rubber composition and a metal and heat resistance of the rubber composition become lower. If the content of the polymer having epoxy group falls within a range of from 5 to 50 parts by mass, the balance in modulus, compression set resistance and heat resistance becomes further excellent.

The polymer having epoxy group used in the present invention is not particularly limited so long as it is crosslinkable with the hydrogenated acrylonitrile-butadiene copolymer rubber by organic peroxide and further has epoxy group. Considering adhesiveness between the rubber composition of the present invention and a metal, a graft copolymer in which a main chain thereof is an organic peroxide-crosslinkable polymer and at least one of graft chains has epoxy group is preferable. Monomer for the graft chain suitably used is glycidyl methacrylate (GMA) or the like. The main chain of the graft copolymer is not particularly limited so long as crosslinking by the organic peroxide is possible, but ethylene type polymers are preferable. Examples of the ethylene type polymer include low density polyethylene (LDPE), ethylene-vinyl acetate copolymer (EVA), ethylene-acrylate copolymer (e.g., ethylene-methyl acrylate copolymer (EMA), ethylene-ethyl acrylate copolymer (EEA) and ethylene methyl methacrylate (EMMA)), ethylene-propylene copolymer (EPM) and polypropylene (PP). The graft chain and main chain may be obtained from the respective one kind of monomer or from at least two kinds of monomers.

The graft copolymer has such a structure that the graft chain is branched and bonded to the main chain. It is therefore considered that the main chain and the hydrogenated acrylonitrile-butadiene copolymer rubber are crosslinked and also epoxy group that is the graft chain is reacted with 2,4-dimercapto-6-substituted-1,3,5-triazine represented by the above formula 1, so that a raw material rubber and a metal are adhered through the resulting graft copolymer.

The above-described Japanese Patent Application Laid-open No. Sho 55(1980)-125155 does not refer to adhesiveness of chlorine-free polymer such as hydrogenated acrylonitrile-butadiene copolymer rubber, and the working examples thereof use chlorinated polyethylene rubber and chlorosulfonated polyethylene rubber. In addition, the above-mentioned patent does not refer to crosslinkability of epoxy resin by organic peroxide crosslinking, and the working examples thereof use epoxy resin having no organic peroxide crosslinkability. In other words, it is assumed that the epoxy resin is added therein, with the expectation of the effect of adhesion to a metal due to the fact that the epoxy resin inserts between chlorine in the polymer and 2,4-dimercapto-6-R-1,3,5-triazine reacted with copper in brass to form a crosslinkage. Adhesion reaction by the same reaction mechanism with the hydrogenated acrylonitrile-butadiene copolymer rubber as a chlorine-free polymer can not be expected, and also the polymer having epoxy group does not co-crosslink with the hydrogenated acrylonitrile-butadiene copolymer rubber as being different from the present invention.

Contrary to this, the present invention is based on the finding that by using an organic peroxide-crosslinkable polymer having epoxy group other than epoxy resin which is generally considered to greatly contribute to adhesiveness to a metal, adhesiveness is improved. Although this reason is not clarified, it is considered as follows. General epoxy resin has poor radical reactivity and hydrogen pulling is difficult to occur. Further, since the main chain does not have double bond other than aromatic ring, crosslinking reaction at the site other than epoxy group is difficult to occur. Contrary to this, the polymer having epoxy group used in the rubber composition of the present invention has high radical reactivity of methylene chain as in ethylene, or has a portion that contributes to crosslinking reaction of, for example, double bond other than aromatic ring, on the main chain. Therefore, bonding to the hydrogenated acrylonitrile-butadiene copolymer rubber is effectively formed, and simultaneously 2,4-dimercapto-6-substituted-1,3,5-triazine bonds to a metal through mercapto group, thereby forming bonding to the polymer having epoxy group by ring-opening reaction of epoxy resin through other mercapto group in the same molecule.

Thus, bonding of the hydrogenated acrylonitrile-butadiene copolymer rubber and the polymer having epoxy group, bonding of the polymer having epoxy group and 2,4-dimercapto-6-substituted-1,3,5-triazine represented by the above formula 1 and bonding of 2,4-dimercapto-6-substituted-1,3,5-triazine and copper in a metal simultaneously occur. As a result, the rubber composition of the present invention and a metal are bonded to form an integral structure. Further, some polymers having epoxy group may react with a metal to bond thereto. In the case of selecting such polymers having epoxy group, bonding between the rubber composition of the present invention and a metal is further strengthened.

If required and necessary, other than the above-described components, the rubber composition of the present invention can contain various additives such as crosslinking aids, reinforcing agents, fillers, antioxidants, processing aids, plasticizers and softening agents, within a range that adhesiveness to a metal, modulus, compression set resistance and heat resistance are not impaired.

If triallyl isocyanurate and/or triallyl cyanurate (hereinafter sometimes referred to as "cyanurate") are blended as the crosslinking aid, modulus and adhesiveness to a metal are improved, which is preferable.

Triallyl isocyanurate and triallyl cyanurate are a trifunctional polymerizable monomer, and are used as the crosslinking aid of organic peroxide-crosslinkable rubber composition. In the rubber composition of the present invention, crosslinking density can be increased to thereby improve modulus. Triallyl isocyanurate and triallyl cyanurate may be used alone or as a mixture thereof.

The content of triallyl isocyanurate and/or triallyl cyanurate in the rubber composition of the present invention is preferably 0.1 to 30 parts by mass per 100 parts by mass of the hydrogenated acrylonitrile-butadiene copolymer rubber used in the present invention, although varying depending on the amount of epoxy group in the polymer having epoxy group, and the like.

Examples of the filler used include silica (white carbon), calcium carbonate, barium carbonate, talc, clay, titanium oxide and carbon black. Of those, silica is preferable. Silica is acidic compounding additive, and contributes to adjust reaction rate of 2,4-dimercapto-6-substituted-1,3,5-triazine represented by the above formula 1, thereby stabilizing physical properties and adhesivenss of the rubber composition.

Silica used is not particularly limited, and examples thereof include dry method white carbon used as a reinforcing agent for rubber, wet method white carbon, colloidal silica and precipitated silica as described in Japanese Patent Application Laid-open No. Sho 62(1987)-62838. Of those, wet method white carbon including hydrous silicic acid as the main component is preferable. Hydrous silicic acid that is the main component of wet method white carbon is preferably one having nitrogen adsorption specific area (BET method) of 50 to 400 $m^2/g$, and preferably 100 to 250 $m^2/g$. Further, the hydrous silicic acid is preferably one having pH (hydrogen ion concentration) of less than 7.0, and more preferably one having pH of 6.7 or less. If the pH is fallen within the above range, it is possible to suppress premature reaction of 2,4-dimercapto-6-substituted-1,3,5-triazine. The nitrogen adsorption specific area is a value measured by BET method according to ASTM D3037 81, and pH is a value obtained by stirring silica in water, filtering off, and measuring pH of the filtrate using pH meter.

The content of silica in the rubber composition of the present invention is preferably 1 to 50 parts by mass per 100 parts by mass of the hydrogenated acrylonitrile-butadiene copolymer rubber used in the present invention, although varying depending on the amount of epoxy group in the polymer having epoxy group.

Triallyl isocyanurate and/or triallyl cyanurate and silica exhibit its effect even if compounded separately. However, it is particularly preferable that a mixture containing triallyl isocyanurate and/or triallyl cyanurate and silica is heat treated to obtain a solidified product (triallyl isocyanurate and/or triallyl cyanurate carried on the silica), and the resulting solidified product is compounded. Triallyl isocyanurate or the like is present on the surface of the silica in the proportion of preferably 30 to 80% by mass, and more preferably 50 to 70% by mass.

Details of formation of the solidified product and the components thereof are not clear, but it is considered that part of triallyl isocyanurate and/or triallyl cyanurate that are polymerizable monomers is subjected to polymerization reaction by heat treatment on the surface of silica particles using hydroxyl groups or the like present on the surface of silica particles as a catalyst, thereby forming a solidified product. To this effect, triallyl isocyanurate and/or triallyl cyanurate in the present invention encompass their oligomers and/or polymers.

The heat treatment conditions may be any conditions so long as such are conditions that triallyl isocyanurate and/or triallyl cyanurate carried on the silica. Preferable heat treatment condition is such that heating is conducted at a temperature of preferably 150° C. or higher, and more preferably 160 to 200° C., for preferably 10 minutes or more, and more preferably about 30 minutes to 24 hours, in air. The heat treatment condition within this range makes it possible to efficiently obtain the solidified product (cyanurate carried on the silica).

Antioxidant is not particularly limited so long as it is generally used in rubber compositions as heat resistant antioxidant, weather resistant antioxidant or the like. Examples of the antioxidant used include amine type antioxidants such as naphthyl amine type (phenyl-α-naphthylamine or the like), diphenyl amine type (octylated diphenyl amine, 4,4'-bis(α,α'-dimethylbenzyl) diphenylamine or the like) and p-phenylenediamine type (N-isopropyl-N'-phenyl-p-phenylendediamine, N-(1,3-dimethylbutyl)-N'-phenyl-p-phenylenediamine, N,N'-di-2-naphthyl-p-phenylenediamine or the like); quinoline type antioxidants such as polymer of 2,2,4-trimethyl-1,2-dihydroxyquinoline; and phenol type antioxidants such as monophenol type (2,6-di-t-butyl-4-methylphenol, styrenated phenol or the like) and bis-, tris- or polyphenol type (tetrakis-[methylene-3-(3',5'-di-t-butyl-4'-hydroxyphenyl)propionate]methane or the like).

Examples of the softening agent include process oils such as paraffin type, naphthene type, or aroma type; vegetable oils such as castor oil, cottonseed oil, linseed oil, rapeseed oil or palm oil; and rosin oils.

Examples of the plasticizer are synthetic plasticizers such as phthalic acid ester type (diethyl phthalate, dibutyl phthalate, di-(2-ethylhexyl)phthalate, di-n-octyl phthalate or the like); adipic acid ester type (di-(2-ethylhexyl)adipate, di-(butoxyethoxyethyl)adipate or the like); and trimellitic acid ester type (tri-(2-ethylhexyl)trimellitate or the like).

The rubber composition of the present invention has high adhesiveness to a metal, high modulus, high permanent compression set (set resistance) and high heat resistance, and therefore can be used in various uses such as belts, tires, rolls, and molded goods, in the form of a composite of rubber and metal. In particular, the rubber composition has high adhesiveness to copper or an alloy containing copper, it can extremely suitably used in composite rubber products of the rubber composition and brass or bronze-plated steel plate.

EXAMPLES

The present invention is described in more detail by referring to the following examples, but the present invention is not limited thereto.

Preparation of Rubber Composition:

Each rubber composition as shown in Table 1 below was obtained using raw materials shown below in the respective amount shown in Table 1 below.

(1) Hydrogenated acrylonitrile-butadiene copolymer rubber (HNBR)

Composition: Unit portion (Y portion: VCN) from unsaturated nitrile 33.0% by mass, unit portion (Z portion: C=C) from conjugated diene 1.3% by mass, unit portion (X portion: C—C) 65.7% by mass obtained by hydrogenating unit portion from ethylenically unsaturated monomer other than unsaturated nitrile and from conjugated diene, iodine value 6.

(2) Polymer having epoxy group

Copolymer of ethylene, methyl acrylate and glycidyl methacrylate (GMA) (E-MA-GMA): "BONDFAST 7L", a product of Sumitomo Chemical Company, Limited.

(3) Compounding agent

SRF grade carbon black: "ASAHI #50", a product of Asahi Carbon Co.

Silica: "NIPSIL VN3", a product of Nippon Silica Industrial Co., Ltd.

Zinc oxide (ZnO)

Stearic acid

Antioxidant: "NOCRAC MBZ", a product of Ouchi Shinko Chemical Industrial Co., Ltd.

Wax: "SAN WAX 171P", a product of Sanyo Chemical Industries, Ltd.

2,4,6-trimercapto-1,3,5-triazine: "ZISNET -F", a product of Sankyo Chemical Industries, Ltd.

Trially isocyanurate (TAIC)

Diallyl phthalate (DAP)

(4) Crosslinking agent 1,3-Bis(t-butyl peroxyisopropyl)benzene, "PARKADOX 14/40" (40 wt % product), a product of Kayaku Akzo Corporation Following tests were conducted on rubber compositions obtained above.

Adhesiveness Test:

Adhesiveness test was conducted according to the definition of JIS K6256 "Adhesive testing methods for vulcanized rubber 5.0; 90° peeling test of metal piece and vulcanized rubber".

Each rubber composition obtained was molded into a sheet having a thickness of 2.5 mm by rolls for laboratory, the sheet was combined with a brass plate and the assembly was pressed. However, cellophane sheet was arranged on the gripping portion by chuck at the time of peeling so that the upper and lower layers were not adhered each other. Thereafter, the laminate was vulcanized at 160° C. for 60 minutes under a face pressure of 3.0 MPa using a press molding machine for laboratory to integrally bond, thereby obtaining a test piece that is a composite of brass and rubber. The test piece was allowed to stand at room temperature for 24 hours and then cut in 2.54 mm width, and peeling test in which the rubber composition and brass were peeled was conducted. Measurement of peel strength was conducted under the condition of tensile speed of 50 mm/min using a tensile tester defined in JIS K6256 according to the definition of JIS K6256 "90° peeling test of metal piece and vulcanized rubber". When the value of peel strength was 150 N/25mm or more, it was evaluated that adhesiveness is good.

Modulus Test(Tensile stress at 100% elongation):

Each rubber composition obtained was vulcanized at 160° C. for 60 minutes under pressure and molded into a sheet having a thickness of 2 mm. Dumbbell No.3 form test piece was punched out from this sheet according to the definition of JIS K6251, and measurement of 100% modulus ($M_{100}$) was conducted according to the definition of JIS K6251. When the value of 100% modulus ($M_{100}$) was 9.0 MPa or more, it was evaluated to be good.

Set Resistance Test:

Each rubber composition obtained was vulcanized at 160° C. for 60 minutes under pressure, and a large-sized test piece as defined in JIS K6262, 5.3.1 was molded according to the definition of JIS K6262 "Permanent set testing method for rubber vulcanized or thermoplastic", item 5 "Compression set testing method". 25% compression was applied to this test piece according to the definition of JIS K6262 "Permanent set testing method for rubber vulcanized or thermoplastic", and compression set was measured under aging conditions of 150° C. and 72 hours. When the value of compression set was 60% or less, it was evaluated that compression set resistance is good.

Heat Resistance Test:

Each rubber composition obtained was vulcanized at 160° C. for 60 minutes under pressure and molded into a sheet having a thickness of 2 mm. Dumbbell No.3 form test piece was punched out from this sheet according to the definition of JIS K6257 "Accelerated aging test methods for vulcanized rubber", item 4 "Air aging test (normal oven method)", and air aging treatment was conducted under the conditions of 150° C. and 168 hours according to the definition of JIS K6257. Elongation at break before and after the treatment was measured and the rate of change ($\Delta E_B$) of elongation at break by the treatment was calculated. When the value of the rate of change ($\Delta E_B$) of elongation at break was −50% or more, it was evaluated that heat resistance is good.

The results obtained are shown in Table 1 below. It is apparent that the rubber composition of the present invention can show high adhesiveness to a metal, which is not realized if either of the compound represented by the above formula 1 or the polymer having epoxy group lacks. Further, the rubber composition of the present invention has high modulus, high compression set resistance and high heat resistance that are equal to those of the conventional rubber compositions.

TABLE 1

|  | Comparative Example 1 | Comparative Example 2 | Example 1 | Example 2 | Example 3 | Example 4 | Example 5 | Example 6 |
| --- | --- | --- | --- | --- | --- | --- | --- | --- |
| Rubber composition | | | | | | | | |
| Raw material rubber | | | | | | | | |
| HNBR | 100.0 | 100.0 | 100.0 | 100.0 | 100.0 | 100.0 | 100.0 | 100.0 |
| Y portion (VCN) | 33.0 | 33.0 | 33.0 | 33.0 | 33.0 | 33.0 | 33.0 | 33.0 |
| Z portion (C=C) | 1.3 | 1.3 | 1.3 | 1.3 | 1.3 | 1.3 | 1.3 | 1.3 |
| X portion (C—C) | 65.7 | 65.7 | 65.7 | 65.7 | 65.7 | 65.7 | 65.7 | 65.7 |
| E-MA-GMA | 0.0 | 0.0 | 5.0 | 10.0 | 20.0 | 30.0 | 50.0 | 100.0 |
| Compounding agent | | | | | | | | |
| SRF grade carbon black | 95.0 | 95.0 | 95.0 | 95.0 | 95.0 | 95.0 | 95.0 | 95.0 |
| Silica | 0.0 | 0.0 | 0.0 | 0.0 | 0.0 | 0.0 | 0.0 | 0.0 |
| ZnO | 2.0 | 2.0 | 2.0 | 2.0 | 2.0 | 2.0 | 2.0 | 2.0 |
| Stearic acid | 1.0 | 1.0 | 1.0 | 1.0 | 1.0 | 1.0 | 1.0 | 1.0 |
| Nocrac MBZ | 1.5 | 1.5 | 1.5 | 1.5 | 1.5 | 1.5 | 1.5 | 1.5 |
| WAX | 1.0 | 1.0 | 1.0 | 1.0 | 1.0 | 1.0 | 1.0 | 1.0 |
| ZISNET-F | 0.0 | 1.0 | 1.0 | 1.0 | 1.0 | 1.0 | 1.0 | 1.0 |
| TAIC | 2.0 | 2.0 | 2.0 | 2.0 | 2.0 | 2.0 | 2.0 | 2.0 |
| DAP | 7.0 | 7.0 | 7.0 | 7.0 | 7.0 | 7.0 | 7.0 | 7.0 |
| Organic peroxide | | | | | | | | |
| Parkadox 14/40 (40 mass % containing product) | 7.5 | 7.5 | 7.5 | 7.5 | 7.5 | 7.5 | 7.5 | 7.5 |
| Adhesiveness: Brass Peel strength (N/25 mm) | 0 | 75 | 200 | 250 | 260 | 240 | 220 | 200 |
| Modulus $M_{100}$ (MPa) | 11.0 | 10.0 | 10.1 | 10.2 | 10.3 | 10.5 | 11.0 | 13.0 |

TABLE 1-continued

|  | | | | | | | | |
|---|---|---|---|---|---|---|---|---|
| Compression set resistance: 150° C. × 72 hours Compression set (%) | 40 | 42 | 45 | 47 | 50 | 52 | 55 | 58 |
| Heat resistance: 150° C. × 168 hours, air aging ΔE$_B$ (%) | −20 | −30 | −30 | −30 | −31 | −31 | −31 | −33 |

|  | Example 7 | Example 8 | Example 9 | Example 10 | Example 11 | Example 12 |
|---|---|---|---|---|---|---|
| Rubber composition | | | | | | |
| Raw material rubber | | | | | | |
| HNBR | 100.0 | 100.0 | 100.0 | 100.0 | 100.0 | 100.0 |
| Y portion (VCN) | 33.0 | 33.0 | 33.0 | 33.0 | 33.0 | 33.0 |
| Z portion (C=C) | 1.3 | 1.3 | 1.3 | 1.3 | 1.3 | 1.3 |
| X portion (C—C) | 65.7 | 65.7 | 65.7 | 65.7 | 65.7 | 65.7 |
| E-MA-GMA | 20.0 | 20.0 | 20.0 | 20.0 | 20.0 | 20.0 |
| Compounding agent | | | | | | |
| SRF grade carbon black | 95.0 | 95.0 | 95.0 | 95.0 | 95.0 | 95.0 |
| Silica | 0.0 | 5.0 | 10.0 | 0.0 | 5.0 | 10.0 |
| ZnO | 2.0 | 2.0 | 2.0 | 2.0 | 2.0 | 2.0 |
| Stearic acid | 1.0 | 1.0 | 1.0 | 1.0 | 1.0 | 1.0 |
| Nocrac MBZ | 1.5 | 1.5 | 1.5 | 1.5 | 1.5 | 1.5 |
| WAX | 1.0 | 1.0 | 1.0 | 1.0 | 1.0 | 1.0 |
| ZISNET-F | 1.0 | 1.0 | 1.0 | 1.0 | 1.0 | 1.0 |
| TAIC | 4.0 | 4.0 | 4.0 | 8.0 | 8.0 | 8.0 |
| DAP | 7.0 | 7.0 | 7.0 | 7.0 | 7.0 | 7.0 |
| Organic peroxide | | | | | | |
| Parkadox 14/40 (40 mass % containing product) | 7.5 | 7.5 | 7.5 | 7.5 | 7.5 | 7.5 |
| Adhesiveness: Brass Peel strength (N/25 mm) | 250 | 270 | 270 | 250 | 270 | 270 |
| Modulus M$_{100}$ (MPa) | 11.1 | 11.5 | 11.7 | 12.5 | 12.9 | 13.2 |
| Compression set resistance: 150° C. × 72 hours Compression set (%) | 47 | 47 | 48 | 45 | 45 | 46 |
| Heat resistance: 150° C. × 168 hours, air aging ΔE$_B$ (%) | −28 | −28 | −29 | −27 | −27 | −28 |

EXAMPLE 1 AND COMPARATIVE EXAMPLES 1 AND 2

It is understood that since, contrary to Example 1, Comparative Example 1 does not use the polymer having organic peroxide-crosslinkable epoxy group and 2,4-dimercapto-6-substituted-1,3,5-triazine of the present invention, Comparative Example 1 is poor in adhesiveness to brass.

Further, it is understood that since, contrary to Example 1, Comparative Example 2 does not use the organic peroxide-crosslinkable polymer having epoxy group of the present invention, Comparative Example 2 is insufficient in adhesiveness to brass.

Contrary to this, since Example 1 uses the organic peroxide-crosslinkable polymer having epoxy group and 2,4-dimercapto-6-substituted-1,3,5-triazine of the present invention, sufficient adhesiveness to brass is obtained.

EXAMPLES 1 TO 6

Examples 1 to 6 are the examples explaining the compounding range of the organic peroxide-crosslinkable polymer having epoxy group of the present invention. It is understood that since the compounding amount is within the range of the present invention in each example, sufficient adhesiveness to brass is obtained.

EXAMPLES 3, 7 AND 10

Those examples are examples explaining the compounding effect of triallyl isocyanurate (TAIC). It is understood that since the organic peroxide-crosslinkable polymer having epoxy group and 2,4-dimercapto-6-substituted-1,3,5-triazine of the present invention are compounded in each example, sufficient adhesiveness to brass is obtained, and also modulus (M$_{100}$) increases as the compounding amount of TAIC increases. In other words, it is understood that the compounding amount of TAIC is effective to obtain high modulus without deterioration of compression set resistance and heat resistance.

EXAMPLES 7 TO 12

Those examples are examples explaining the effect of use of triallyl isocyanurate (TAIC) and silica in combination. It is understood that since the organic peroxide-crosslinkable polymer having epoxy group and 2,4-dimercapto-6-substituted-1,3,5-triazine of the present invention are compounded in each example, sufficient adhesiveness to brass is obtained, and peel strength and modulus (M$_{100}$) increase by compounding TAIC and silica in combination (Examples 8 and 9 as compared with Example 7; Examples 11 and 12 as compared with Example 10). In other words, it is understood that use of TAIC and silica in combination is effective to obtain high modulus without deterioration of compression set resistance and heat resistance.

What is claimed is:

1. A rubber composition comprising:
   (1) 100 parts by mass of a copolymer rubber having an iodine value of 15 or less containing, in polymer chain, 10 to 45% by mass of a unit portion (Y portion: VCN) from unsaturated nitrile, 0 to 5% by mass of a unit portion (Z portion: C=C) from conjugated diene and 90 to 50% by mass of a unit portion (X portion: C—C) obtained by hydrogenating the unit portion from an ethylenically unsaturated monomer other than unsaturated nitrile and/or from conjugated diene;

(2) 1 to 10 parts by mass of an organic peroxide;

(3) 0.1 to 15 parts by mass of 2,4-dimercapto-6-substituted-1,3,5-triazine represented by the following formula 1:

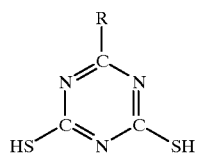

[1]

wherein R represents a group selected from the group consisting of mercapto group, alkoxy group, monoalkylamino group, dialkylamino group, monocycloalkylamino group, dicycloalkylamino group and N-alkyl-N-arylamino group; and (4) 1 to 100 parts by mass of an organic peroxide-crosslinkable polymer having an epoxy group.

2. The rubber composition as claimed in claim 1, wherein the polymer having the epoxy group is a graft copolymer in which at least one of graft chains in the graft copolymer has an epoxy group.

3. The rubber composition as claimed in claim 1 or 2, further comprising 1 to 30 parts by mass of triallyl isocyanurate and/or triallyl cyanurate.

4. The rubber composition as claimed in claim 1 or 2, further comprising 1 to 50 parts by mass of silica.

5. The rubber composition as claimed in claim 3, further comprising 1 to 50 parts by mass of silica.

* * * * *